US012600177B2

(12) United States Patent
Guimard et al.

(10) Patent No.: US 12,600,177 B2
(45) Date of Patent: Apr. 14, 2026

(54) TIRE COMPRISING AT LEAST ONE SIDEWALL WITH A PROTECTIVE PROTUBERANCE

(71) Applicant: COMPAGNIE GENERALE DES ETABLISSEMENTS MICHELIN, Clermont-Ferrand (FR)

(72) Inventors: Bruno Guimard, Clermont-Ferrand (FR); Olivier Muhlhoff, Clermont-Ferrand (FR); Vincent-Jacques Chaput, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 224 days.

(21) Appl. No.: 18/009,555

(22) PCT Filed: Jun. 7, 2021

(86) PCT No.: PCT/FR2021/051016
§ 371 (c)(1),
(2) Date: Dec. 9, 2022

(87) PCT Pub. No.: WO2021/250343
PCT Pub. Date: Dec. 16, 2021

(65) Prior Publication Data
US 2023/0219376 A1 Jul. 13, 2023

(30) Foreign Application Priority Data
Jun. 10, 2020 (FR) ...................................... 2006073

(51) Int. Cl.
B60C 13/02 (2006.01)
B60C 13/00 (2006.01)
(Continued)

(52) U.S. Cl.
CPC ........ B60C 13/003 (2013.01); B60C 15/0242 (2013.01)

(58) Field of Classification Search
CPC .......................... B60C 15/0242; B60C 15/023
See application file for complete search history.

(56) References Cited

U.S. PATENT DOCUMENTS 4,434,830 A 3/1984 Landers
2003/0209302 A1* 11/2003 Hanya ................. B60C 15/0242
152/523
(Continued)

FOREIGN PATENT DOCUMENTS

AT 354869 2/1979
FR 3 059 944 6/2018
(Continued)

OTHER PUBLICATIONS

Machine Translation: JP-2000006621-A, Fujiwara K, (Year: 2024).*
Machine translation: JP-2005059751-A, Watabe K, (Year: 2025).*

*Primary Examiner* — Kendra Ly
(74) *Attorney, Agent, or Firm* — COZEN O'CONNOR

(57) ABSTRACT

A tire (1), intended in particular for a private passenger vehicle and comprising at least one sidewall (3) with a protuberance of the sidewall (3) close to the connection of the tire with its mounting rim (2), and intended to reduce the aerodynamic drag and hence the resistance to forward motion of the wheel, in order to contribute to the reduction in fuel consumption and hence to the reduction in $CO_2$ emissions. According to the invention, when the tire (1) is mounted on the rim (2) and inflated to a pressure as defined by the "ETRTO" standard, the radially inner end I of the protuberance (6) is positioned radially inside the radially outermost point J of the rim flange (21) at a radial distance H1 at most equal to 10 mm, or radially outside the radially
(Continued)

outermost point J of the rim flange (21) at a radial distance
H1 at most equal to 4 mm.

15 Claims, 5 Drawing Sheets

(51) Int. Cl.
  B60C 15/02 (2006.01)
  B60C 15/024 (2006.01)

(56) References Cited

U.S. PATENT DOCUMENTS

| | | | |
|---|---|---|---|
| 2004/0187995 A1* | 9/2004 | Yoshinaka | ............... B60C 3/04 |
| | | | 152/454 |
| 2007/0029023 A1 | 2/2007 | Miyazaki | |
| 2010/0096910 A1* | 4/2010 | Egbert | ................. B60B 21/104 |
| | | | 301/95.107 |
| 2014/0238569 A1 | 8/2014 | Ferigo | |

FOREIGN PATENT DOCUMENTS

| | | | | |
|---|---|---|---|---|
| GB | 2 104 459 | 3/1983 | | |
| JP | 2000-006621 | 1/2000 | | |
| JP | 2000006621 A | * 1/2000 | .......... B60C 15/023 |
| JP | 2005-059751 | 3/2005 | | |
| JP | 2005059751 A | * 3/2005 | | |
| WO | WO 2018/109328 | 6/2018 | | |

\* cited by examiner

TIRE COMPRISING AT LEAST ONE SIDEWALL WITH A PROTECTIVE PROTUBERANCE

RELATED APPLICATIONS

This is a U.S. National Phase Application under 35 USC 371 of International Application PCT/FR2021/051016 filed on Jun. 7, 2021.

This application claims the priority of French application no. FR 2006073 filed Jun. 10, 2020, the entire content of all of which is hereby incorporated by reference.

FIELD OF THE INVENTION

The present invention is directed to a tire, more particularly intended to be fitted to a private passenger vehicle and comprising at least one sidewall with a protective protuberance which is intended to protect the connection between the tire and its mounting rim.

BACKGROUND OF THE INVENTION

In view of current concerns relating to the protection of the environment, vehicle manufacturers have a permanent objective of reducing CO2 emissions of private passenger vehicles by significantly reducing their fuel consumption. It is known that the fuel consumption increases with the resistance to forward motion of the vehicle. A major component in said resistance to forward motion arises from the aerodynamic drag forces applying to the vehicle in motion. It has been shown that the wheels, i.e. tires mounted on rims, fitted to the vehicle make a significant contribution to the generation of aerodynamic drag forces.

In general, it is known that an object in motion in a fluid, such as a wheel in rotation in the air, is subject to pressure and friction due to the viscosity of the air. The combination of these two types of force constitutes aerodynamic drag. This aerodynamic drag corresponds to the aerodynamic resistance which opposes the forward motion of the object in the fluid, i.e. of the wheel in the air. This aerodynamic drag is proportional to the square of the speed of advance of the vehicle. Above a certain speed, typically above 30 km/h, and on horizontal ground, aerodynamic drag is the prime source of resistance to forward motion applying to a wheel.

It is generally known that the aerodynamic drag applying to a wheel is generated by the turbulence of air flow around the wheel. To reduce this aerodynamic drag, it is accordingly effective to delay as far as possible the detachment of the air flow from the sidewall of the tire. The air flow detaches from the tire sidewall sooner, the greater the roughness such as for example the markings of the tire, or the connection between the tire and its mounting rim. Thus an outer profile of the tire comprising perfectly smooth sidewalls in continuity with the flanges of the mounting rim would theoretically be optimal with respect to aerodynamic drag.

A tire is normally made up of a tread, which is intended to come into contact with the ground via a tread surface and connected at its two axial ends to two sidewalls, extended by two beads which are intended to come into contact with the flanges of a rim.

As a tire has a geometric form of revolution around its rotational axis, it may be described in a reference cylinder comprising respectively circumferential, axial and radial directions. In the text below, the circumferential (or longitudinal), axial (or transverse) and radial directions respectively designate a direction tangential to the tread surface and oriented in the rotational direction of the tire, a direction parallel to the rotational axis of the tire, and a direction perpendicular to the rotational axis of the tire. A radial (or meridian) plane is defined by a radial direction and the axial direction, and contains the rotational axis of the tire. A circumferential plane is defined by a radial direction and a circumferential direction, and is therefore perpendicular to the rotational axis of the tire. The circumferential plane passing through the middle of the tread is known as the equatorial (or median) plane. Consequently, in the present document, the terms "radially", "axially" and "circumferentially" respectively mean "in a radial direction", "in the axial direction", and "in a circumferential direction". The expressions "radially inner" or "radially outer" mean "closer to" or respectively "further away from the rotational axis of the tire in a radial direction". The expressions "axially inner" and "axially outer" mean respectively "closer to" and "further away from the median plane of the tire in the axial direction".

The connection between the tire and its mounting rim is a zone particularly susceptible to damage, for example impacts against pavements, in particular for tires with low sidewalls. This damage may lead to local deformation of the rim flanges, which may lead to loss of seal and hence loss of inflation pressure of the tire. They may also cause damage to the tire beads in contact with the rim flanges, and may thus significantly reduce the service life of the tire.

To protect this connection, it is known to arrange a protective cord in the radially inner part of a tire sidewall, close to the bead. But the presence of this protective cord, which constitutes a sidewall protuberance, causes a geometric discontinuity between the radially inner part of the tire sidewall and the rim flange, thus generating turbulence in the air flow and consequently increasing aerodynamic drag. For example, document US 20070029023 A1 describes a protective cord positioned in the radially inner part of a tire sidewall and arranged discontinuously in the circumferential direction, forming a protuberance liable to increase aerodynamic drag.

Document WO 2018109328 A1 describes a protective cord or sidewall protuberance with suitable geometric form and positioning, designed to reduce aerodynamic drag.

SUMMARY OF THE INVENTION

The object of the present invention, for a tire more particularly intended to be fitted to a private passenger vehicle and comprising at least one sidewall with a sidewall protuberance close to the connection of the tire with its mounting rim, is to further reduce aerodynamic drag and hence resistance to forward motion of the wheel, in order to contribute to reducing fuel consumption and hence reducing CO2 emissions.

This object has been achieved for a tire for a private passenger vehicle, intended to be mounted on a rim as defined by the standard of the "European Tire and Rim Technical Organisation" or "ETRTO", comprising:

two sidewalls connecting a crown to two respective beads, each intended to come into contact with a rim flange having a radially outermost point J, at least one sidewall comprising a protuberance intended to protect a rim flange and extending radially inward from an axially outer face of the sidewall and circumferentially in a circumferential direction of the tire, the protuberance having, in any meridian plane containing the rotational axis of the tire, a meridian section delimited by a contour having a radially innermost point, called the radially inner end I of the protuberance, when the tire is mounted on the rim and inflated to a pressure as defined by the ETRTO standard, the radially inner end I of the protuberance is positioned radially inside the radially outermost point J of the rim flange at a radial distance H1 at most equal to 10 mm, or radially outside the radially outermost point J of the rim flange at a radial distance H1 equal at most to 4 mm.

An object of the invention essentially aims to optimise the geometric positioning of the radially inner end I of the protuberance relative to the radially outermost point J of the rim flange in order to limit the turbulence of the air flow at the connection of the tire to its rim, and consequently reduce the aerodynamic drag which adversely affects the resistance to forward motion and fuel consumption. The rim on which the tire is mounted is defined by the standard of the "European Tire and Rim Technical Organisation" or "ETRTO". For a given tire size, several rim contours are generally permitted, these being defined in the "Standards Manual 2019", in the "Passenger Car Tires" section under the heading "Approved Rim Contours".

In view of this objective, the radially inner end I of the protuberance must lie within a certain value range around the radially outermost point J of the rim flange, generally corresponding to the radially outermost point of the circular portion of the rim flange at which the tire bead is located. Two positioning configurations may then occur, depending on whether the radially inner end I of the protuberance is radially inside or radially outside the radially outermost point J of the rim flange.

In a first configuration, in which the radially inner end I of the protuberance is radially inside the radially outermost point J of the rim flange, the protuberance covers the rim flange in the mounted and inflated state of the tire, and—a fortiori—in its crushed, mounted and inflated state, since under the effect of squashing of the tire, the radially inner end I of the protuberance will still move radially towards the inside relative to the mounted inflated state. In this first configuration, the inventors have shown that the radially inner end I of the protuberance must not extend too far radially towards the inside, more precisely not more than 10 mm relative to the radially outermost point J of the rim flange. In fact beyond 10 mm, the protuberance has a relatively great length and a thin section, and hence a flexibility which may lead to risk of detachment from the rim flange and wobble of said protuberance, which can generate turbulence in the air flow.

In a second configuration, in which the radially inner end I of the protuberance is radially outside the radially outermost point J of the rim flange, the protuberance does not cover the rim flange in the mounted and inflated state of the tire, with a radially inner end I of the protuberance positioned, relative to the radially outermost point J of the rim flange, at a radial distance H1 which is not too great, at most equal to 4 mm. In the crushed, mounted and inflated state of the tire, the protuberance may or may not cover the rim flange depending on the selected rim flange profile. If the protuberance covers the rim flange, during travel this covering may reduce the aerodynamic drag, as in the first configuration described above. If the protuberance does not cover the rim flange, the space between the radially inner end I of the protuberance and the rim flange is liable to generate local turbulence; however, this has a limited impact on the aerodynamic drag because of the limited width of this space, less than 4 mm Finally, a protuberance giving no cover in the crushed, mounted and inflated state advantageously promotes drainage of the water which may build up at the interface between the tire and its rim in the case of poor weather.

Also, in both configurations, the geometry of the protuberance allows easy mounting of the tire using conventional automatic or semiautomatic mounting means.

The rim flange comprising, in any meridian plane, a radially outer circular portion linked by an intermediate radial portion to a radially inner, substantially axial portion, the radially inner end I of the protuberance is advantageously positioned axially outside the radial portion of the rim flange at an axial distance B1 at least equal to 5 mm, preferably at least equal to 8 mm. The axial distance B1 is selected as a function of the axial width B of the rim flange measured between the axially outermost point of the rim flange and the intermediate radial portion of the rim flange. It should be noted that in part R1 of the Standards Manual 2019, the ETRTO standard proposes several variants of axial width B for the rim flange. A minimal axial distance B1 equal to 5 mm is compatible with the smallest axial widths B of the rim flange recommended by the ETRTO standard and close to 8 mm. Also, to obtain the best possible aerodynamic efficiency of a mounted assembly, it is advantageous that the maximum axial or "overall" width of the tire, mounted on its standard rim and inflated to nominal pressure in the sense of the ETRTO standard, is equal to the maximum axial or overall width of the rim increased by 8 to 20 mm. For a mounted assembly which is highly optimised aerodynamically, vehicle manufacturers have an interest in selecting the smallest possible axial widths B of the rim flange, for example equal to around 8 mm.

The rim flange comprising, in any meridian plane, a radially outer circular portion linked by an intermediate radial portion to a radially inner, substantially axial portion, the radially inner end I of the protuberance is also advantageously positioned axially outside the radial portion of the rim flange at an axial distance B1 at most equal to 21 mm, preferably at most equal to 16 mm A maximum axial distance B1 equal to 21 mm is compatible with the greatest axial widths B of the rim flange recommended by the ETRTO standard. Also, the greater the difference between the axial distance B1 and the axial width B of the rim flange, the more the rim flange is protected, for example on scraping of a tire against a pavement, but this reduces the aerodynamic optimisation and hence the energy efficiency.

The meridian section of the protuberance having a larger dimension in a middle direction D1, the middle direction D1 of the meridian section of the protuberance advantageously forms, with a radial direction, an angle A at least equal to 5°, preferably at least equal to 10°. A minimal angle A equal to 5°, preferably equal to 10°, avoids the detachment of the protuberance under the effect of centrifugal force. In fact during travel, the centrifugal force of the tire crown leads to a pivoting of the bead relative to the rim flange and a reduction in angle A.

The meridian section of the protuberance having a larger dimension in a middle direction D1, the middle direction D1 of the meridian section of the protuberance also advantageously forms, with a radial direction, an angle A at most equal to 30°, preferably at most equal to 20°. A maximal angle A at most equal to 30°, preferably at most equal to 20°, avoids degrading the desired optimised aerodynamic effect while guaranteeing a suitable geometry of the sidewall profile up to the end of the protuberance.

The contour of the protuberance advantageously comprises an axially inner connection point K of the protuberance to the axially outer face of the sidewall, wherein the straight line tangent to the contour has an axial direction, positioned radially outside the radially outermost point J of the rim flange at a radial distance H2 at least equal to 3 mm. The radial distance H2 corresponds to the radial play between the radially inner connection of the protuberance to the sidewall and the rim flange. With a radial distance H2 of less than 3 mm, this radial play becomes too small and may lead to poor mounting of the tire on its rim.

The axially inner connection point K of the protuberance to the axially outer face of the sidewall is advantageously positioned radially outside the radially outermost point J of the rim flange at a radial distance H2 at most equal to 10 mm With a radial distance H2 of more than 10 mm, this radial play becomes too great and may lead to insufficient support of the tire on the rim flange, in particular under an axial (or lateral) force.

The axially inner connection point K of the protuberance to the axially outer face of the sidewall is advantageously positioned axially outside the radially outermost point of the rim flange. This axial positioning of the axially inner connection of the protuberance to the sidewall and the rim flange allows a satisfactory compromise between the ease of mounting of the tire on its rim and good support of the tire on the rim flange. Furthermore, this axial offset towards the outside allows mounting of the tire on a rim with rim flanges which may have different axial widths B.

The connection radius R, defined as the radius of curvature at the axially inner connection point K of the protuberance to the axially outer face of the sidewall, is at least equal to 2 mm A connection radius at least equal to 2 mm limits stress concentrations and consequently the appearance of cracks, hence a better resistance to tearing of the protuberance, in particular in case of scraping of the tire against a pavement.

The thickness E of the meridian section of the protuberance measured along the axial line D2, radially inside the axially inner connection point K of the protuberance to the axially outer face of the sidewall and positioned at a radial distance H3 therefrom equal to 3 mm, is advantageously at least equal to 1.5 mm. The thickness E is measured in the axial direction outside the zone of connection of the protuberance to the sidewall, radially towards the inside at a radial distance H3 equal to 3 mm, in order to facilitate measurement. A protuberance thickness at least equal to 1.5 millimetres is advantageous for production of the tire, since in particular it allows the integrity of the protuberance to be guaranteed on removal of the tire from the mould after curing. It also allows a good mechanical strength of the protuberance during mounting of the tire on the rim and under the effect of mechanical stresses, in particular crushing, during motion of the tire. Finally, it guarantees effective protection of the rim flange against impacts, for example against a pavement.

The thickness E of the meridian section of the protuberance measured along the axial line D2, radially inside the axially inner connection point K of the protuberance to the axially outer face of the sidewall and positioned at a radial distance H3 therefrom equal to 3 mm, is also advantageously at most equal to 8 mm A protuberance thickness at most equal to 8 mm is advantageous since it has no adverse effect on the mass and hence the cost of the tire. Furthermore, it guarantees enough flexibility of the protuberance to ensure good mounting of the tire on the rim. Finally, it allows limiting of the maximum width of the tire mounted on its rim and inflated, and hence the aerodynamic effects.

The protuberance is advantageously in contact with the rim flange via at least one contact means distributed circumferentially. The circumferential distribution of the contact means may be continuous or discontinuous. A protuberance in circumferentially distributed contact with the rim flange ensures a quasi-continuity between the sidewall and the rim flange, which is favourable for optimisation with respect to aerodynamic forces. In addition, the contact surface must be advantageously limited in order to minimise friction between the protuberance and the rim flange, which causes energy dissipation and hence adversely affects the resistance to forward motion.

Each sidewall advantageously comprises a protuberance. In general, the protuberance is necessary to protect the tire sidewall positioned towards the outside of the vehicle, since this is the sidewall most likely to come into contact with an obstacle such as a pavement and be most involved in the phenomenon of detachment of the air flow during motion. However, air flows also exist on the side of the sidewall positioned towards the inside below the body of the vehicle, hence the benefit of a protuberance optimised for aerodynamics relative to this sidewall facing the inside of the vehicle. Also, in the case of a directional tire, i.e. with a specific rolling direction, the presence of a protuberance on each sidewall allows the tire to be mounted on either the right-hand side or on the left-hand side of the vehicle, depending on the direction of movement.

The tire having a radially outermost point M in a median plane and a theoretical height H in the sense of the ETRTO standard, measured between the radially outermost point M of the tire and the radially innermost point of the rim flange, the tire advantageously has, on the axially outer face of each sidewall, an axially outermost point N positioned radially relative to the radially outermost point M, at a radial distance H4 at least equal to H/2+5 mm. In other words, it is useful to have the axially outermost point N of the sidewall as close as possible to the rim flange so that the protuberance is close to the rim flange and ensures a better geometric continuity between the sidewall and the rim flange. This configuration generally applies to a so-called "short sidewall" tire, in which the radial height H, in the sense of the ETRTO standard, is preferably between 75 mm and 105 mm.

Advantageously, the axially outer face of each sidewall, from the axially outer end of the tread, also called the shoulder, to the radially inner end of the protuberance has a continuously differentiable profile in the mathematical sense, i.e. with no singular point with outward or inward angles, this profile therefore being optimal in terms of aerodynamics.

Also advantageously, the axially outer face of each sidewall comprises raised relief markings relative to said axially outer face, with a thickness most equal to 0.6 mm, preferably at most equal to 0.4 mm, so as to limit disruption of the air flow.

Also advantageously, the axially outer face of each sidewall comprises recessed markings relative to said axially outer face, i.e. with no interaction with the air flow.

Another object of the invention concerns a mounted assembly comprising a tire according to any of the above-described embodiments of the invention, mounted on its rim.

BRIEF DESCRIPTION OF THE DRAWINGS

The characteristics of the invention are illustrated in schematic FIGS. 1 to 5, and not shown to scale.

DETAILED DESCRIPTION OF THE DRAWINGS

Figure 1:
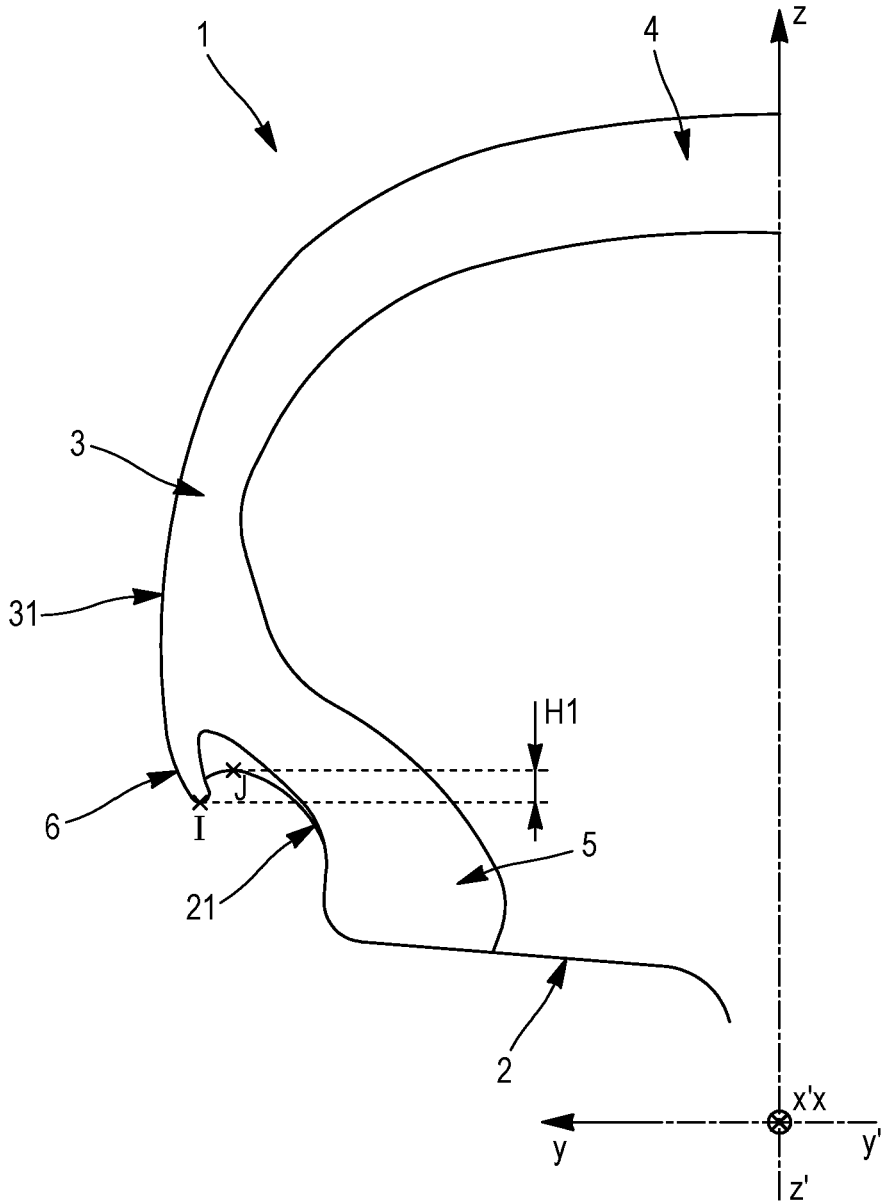
FIG. 1 is a meridian half-section of a tire mounted on a rim in a first embodiment of the invention, with a radially inner end of the protuberance radially inside the rim flange.

FIG. 1 shows a meridian half-section in a meridian plane YZ of a tire 1 mounted on its rim 2, according to a first embodiment of the invention, with a radially inner end I of the protuberance 6 radially inside the rim flange 21. The tire 1 for a private passenger vehicle, intended to be mounted on a rim 2 as defined by the standard of the "European Tire and Rim Technical Organisation" or "ETRTO", comprises two sidewalls 3 linking a crown 4 to two respective beads 5, each intended to come into contact with a rim flange 21 having a radially outermost point J. At least one sidewall 3 comprises a protuberance 6 intended to protect a rim flange 21 and extending radially towards the inside from an axially outer face 31 of the sidewall and circumferentially in a circumferential direction XX' of the tire. In the meridian plane YZ containing the rotational axis YY' of the tire, the protuberance 6 has a meridian section delimited by a contour having a radially innermost point, known as the radially inner end I of the protuberance 6. According to the first embodiment of the invention, when the tire 1 is mounted on the rim 2 and inflated to a pressure as defined by the ETRTO standard, the radially inner end I of the protuberance 6 is positioned radially inside the radially outermost point J of the rim flange 21, at a radial distance H1 at most equal to 10 mm.

Figure 2:
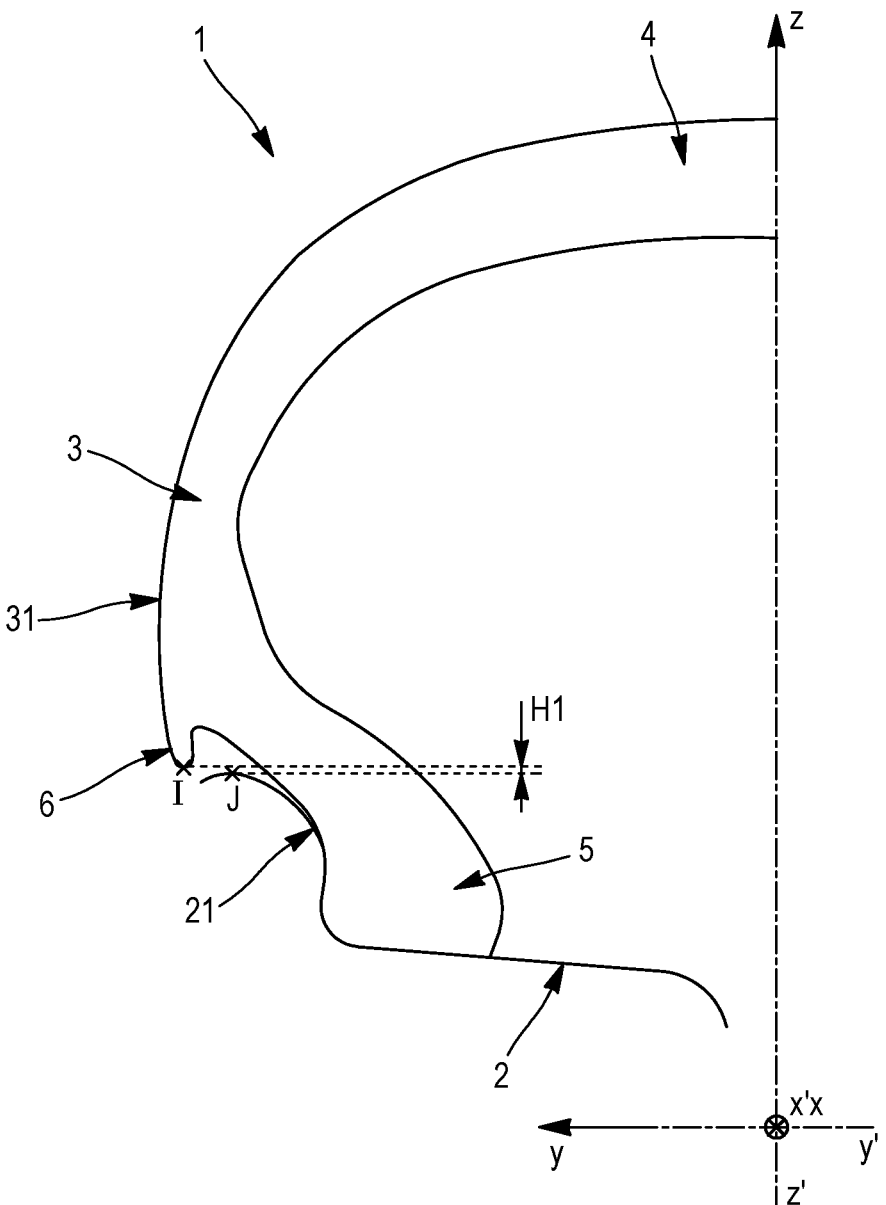
FIG. 2 is a meridian half-section of a tire mounted on a rim in a second embodiment of the invention, with a radially inner end of the protuberance radially outside the rim flange.

FIG. 2 shows a meridian half-section of a tire mounted on a rim according to a second embodiment of the invention, with a radially inner end of the protuberance radially outside the rim flange. According to the second embodiment of the invention, when the tire 1 is mounted on the rim 2 and inflated to a pressure as defined by the ETRTO standard, the radially inner end I of the protuberance 6 is positioned radially outside the radially outermost point J of the rim flange 21, at a radial distance H1 at most equal to 4 mm.

Figure 3:
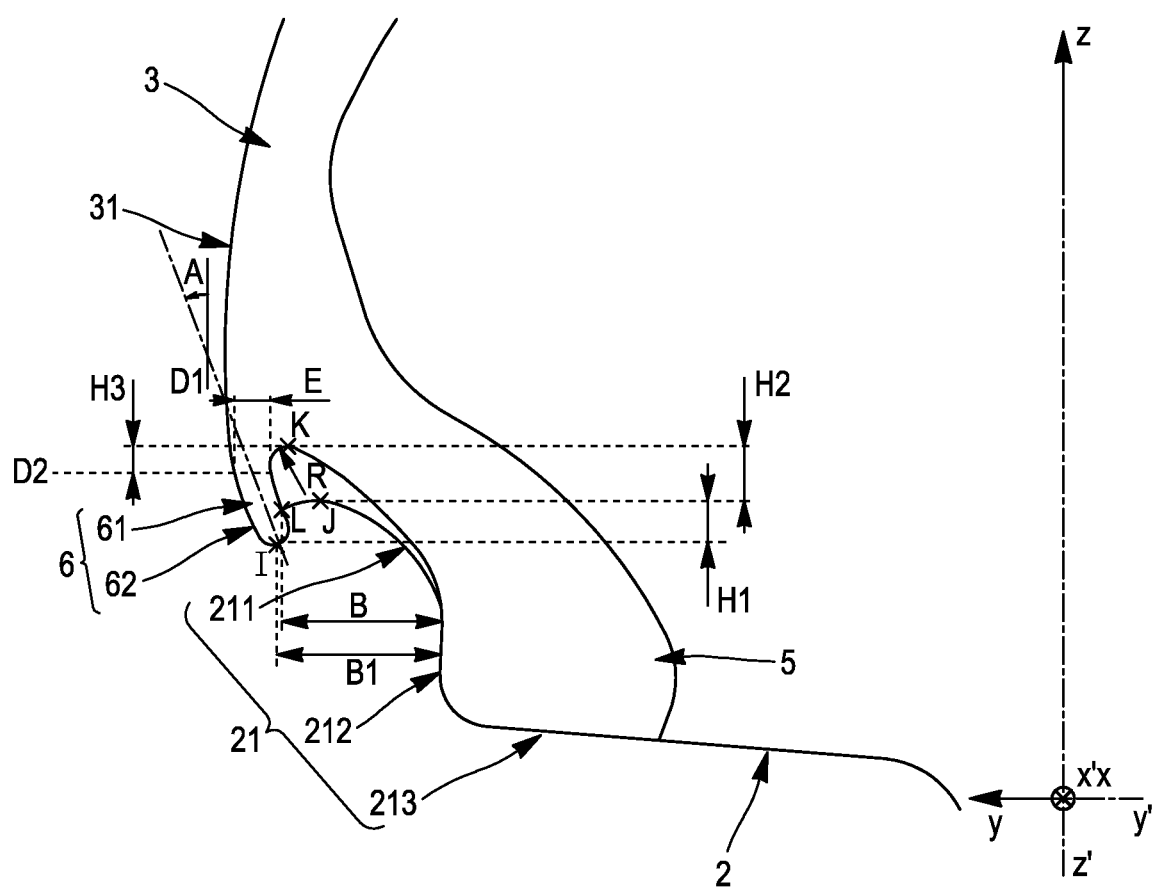
FIG. 3 is a local view of the connection of a tire bead to its rim according to a preferred variant of the first embodiment of the invention.

FIG. 3 is a local view of the connection of a bead 5 of the tire 1 with its rim 2 according to a preferred variant of the first embodiment of the invention, in which the radially inner end I of the protuberance 6 is radially inside the rim flange 21. More precisely, the radially inner end I of the protuberance 6 is the radially inner end I of the contour 62 of the meridian section 61 of the protuberance 6. As shown in FIG. 1, when the tire 1 is mounted on the rim 2 and inflated to a pressure as defined by the ETRTO standard, the radially inner end I of the protuberance 6 is positioned radially inside the radially outermost point J of the rim flange 21, at a radial distance H1 at most equal to 10 mm. The rim flange 21 comprises, in the meridian plane YZ, a radially outer circular portion 211 connected by an intermediate radial portion 212 to a substantially axial, radially inner portion 213. It also has an axial width B measured between the radial portion 212 and the axially outer end L of the circular portion 211. In this variant of the first embodiment, the radially inner end I of the protuberance 6 is positioned axially outside the radial portion 212 of the rim flange 21, at an axial distance B1 at least equal to 5 mm, preferably at least equal to 8 mm, and at most equal to 21 mm, preferably at most equal to 16 mm. The meridian section 61 of the protuberance 6 having a greatest dimension in a middle direction D1, the middle direction D1 of the meridian section 61 of the protuberance 6 forms, with a radial direction ZZ', an angle A at least equal to 5°, preferably at least equal to 10°, and at most equal to 30°, preferably at most equal to 20°. Furthermore, the contour 62 of the protuberance 6 comprises an axially inner connection point K of the protuberance 6 to the axially outer face 31 of the sidewall, wherein the straight line tangent to the contour 62 has an axial direction YY' positioned radially outside the radially outermost point J of the rim flange 21, at a radial distance H2 at least equal to 3 mm and at most equal to 10 mm. In addition, the axially inner connection point K of the protuberance 6 to the axially outer face 31 of the sidewall is positioned axially outside the radially outermost point J of the rim flange 21. The connection radius R at point K is at least equal to 2 mm Finally, thickness E of the meridian section 61 of the protuberance 6 measured along the axial line D2, radially inside the axially inner connection point K of the protuberance 6 to the axially outer face 31 of the sidewall and positioned at a radial distance H3 therefrom equal to 3 mm, is at least equal to 1.5 mm and at most equal to 8 mm.

Figure 4:
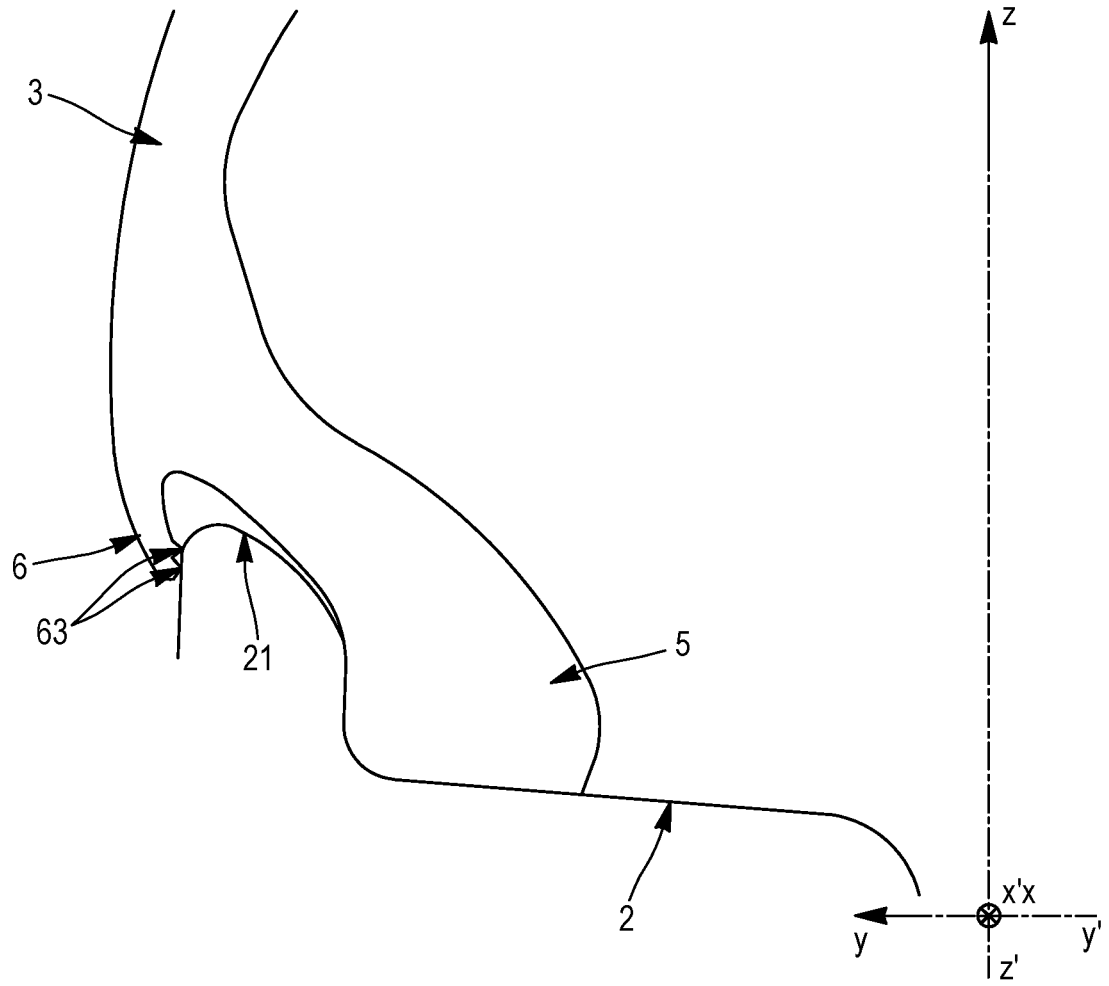
FIG. 4 is a local view of the connection of a tire bead to its rim according to a first variant of the first embodiment of the invention.

FIG. 4 is a local view of the connection of a bead 5 of the tire 1 to its rim 2 according to a first variant of the first embodiment of the invention, with a radially inner end I of the protuberance 6 radially inside the rim flange 21. In the variant shown, the protuberance 6 is in contact with the rim flange 21 via two contact means 63 in relief relative to the protuberance 6 and distributed circumferentially, either continuously or discontinuously.

Figure 5:
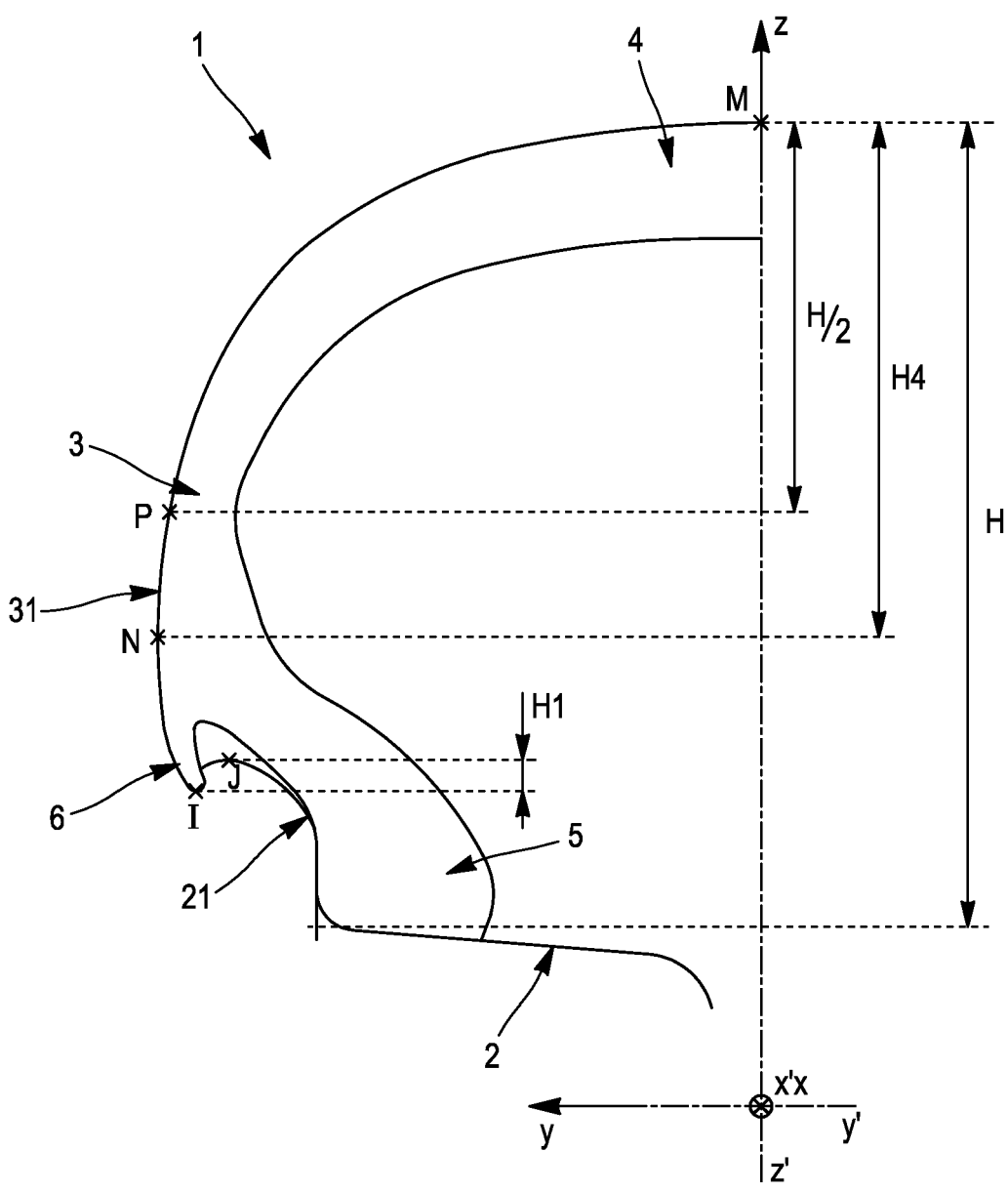
FIG. 5 is a meridian half-section of a tire mounted on a rim in a second variant of the first embodiment of the invention, with a radially inner end of the protuberance radially inside the rim flange.

FIG. 5 is a meridian half-section of a tire 1 mounted on its rim 2 according to a second variant of the first embodiment of the invention, with a radially inner end I of the protuberance 6 radially inside the rim flange 21. In the variant shown, the tire 1 having a radially outermost point M in a median plane XZ, and a theoretical height H in the sense of the ETRTO standard measured between the radially outermost point M of the tire 1 and the radially innermost point of the rim flange 21, the tire 1 has, on the axially outer face 31 of each sidewall 3, an axially outermost point N radially positioned, relative to the radially outermost point M, at a radial distance H4 at least equal to H/2+5 mm, wherein H/2 is half the sidewall height measured between the radially outermost point M of the tire 1 and the point P halfway up the sidewall 3. This is a typical sidewall geometry of a short sidewall tire, in which the radial height H in the sense of the ETRTO standard preferably lies between 75 mm and 105 mm.

The inventors have studied this invention more particularly for a tire I1 of dimension 235/60 R 18, intended to carry a recommended load equal to 875 kg, and a tire I2 of dimension 245/35 R 20, intended to carry recommended load equal to 615 kg. For each of these two tires I1 and I2, the geometric dimensions were determined on the tire mounted on the rim and inflated to a pressure equal to 2.5 bar.

The inventors simulated the mechanical and aerodynamic behaviour of two exemplary embodiments I1 and I2, respectively 235/60 R 18 and 245/35 R 20, using a finite element calculation method, and were able to verify the efficacy of such a design with respect to delaying the detachment of the air flow at the sidewall of the tire.

The main geometric characteristics of the two examples studied are shown in the table below:

TABLE 1

| Characteristics | I1 (235/60 R 18) | I2 (245/35 R 20) |
|---|---|---|
| Axial width B of rim flange 21 (mm) | 11.6 mm | 12.7 mm |
| Radial distance H1 between points I and J (mm) | 7.5 mm | 0 mm |
| Axial distance B1 between point I and the radial portion 212 of the rim flange 21 (mm) | 12.8 mm | 14.3 mm |
| Radial distance H2 between points K and J (mm) | 4.8 mm | 4 mm |
| Radial distance H3 between point K and line D2 at which the thickness E is measured (mm) | 3 mm | 3 mm |
| Thickness E (mm) | 2.2 mm | 2 mm |
| Angle A of middle direction D1 (°) | 12° | 13° |

The scope of protection of the invention is not limited to the examples given hereinabove. The invention is embodied in each novel characteristic and each combination of characteristics, which includes every combination of any features which are stated in the claims, even if this feature or combination of features is not explicitly stated in the examples.

The invention claimed is:

1. An assembly comprising:
a rim as defined by the standard of "European Tire and Rim Technical Organisation" or "ETRTO"; and
a tire for a private passenger vehicle, mounted on the rim, comprising:
two sidewalls connecting a crown to two respective beads, each intended to come into contact with a rim flange having a radially outermost point J,
at least one sidewall comprising a protuberance intended to protect a rim flange and extending radially inward from an axially outer face of the sidewall and circumferentially in a circumferential direction (XX') of the tire,
the protuberance having, in any meridian plane (YZ) containing the rotational axis (YY') of the tire, a meridian section delimited by a contour having a radially innermost point, called the radially inner end I of the protuberance,
wherein when the tire is mounted on the rim and inflated to a pressure as defined by the "ETRTO" standard, the radially inner end I of the protuberance is positioned radially outside the radially outermost point J of the rim flange at a radial distance H1 equal at most to 4 mm,
wherein the contour of the protuberance comprises an axially inner connection point K of the protuberance to the axially outer face of the sidewall that is spaced apart from the rim, wherein the straight line tangent to the contour has an axial direction (YY'), positioned radially outside the radially outermost point J of the rim flange at a radial distance H2 at least equal to 3 mm.

2. The assembly according to claim 1, wherein the rim flange comprises, in any meridian plane (YZ), a radially outer circular portion linked by an intermediate radial portion to a radially inner, substantially axial portion, and wherein the radially inner end I of the protuberance is positioned axially outside the radial portion of the rim flange at an axial distance B1 at least equal to 5 mm.

3. The assembly according to claim 1, wherein the rim flange comprises, in any meridian plane (YZ), a radially outer circular portion linked by an intermediate radial portion to a radially inner, substantially axial portion, and wherein the radially inner end I of the protuberance is positioned axially outside the radial portion of the rim flange at an axial distance B1 at most equal to 21 mm.

4. The assembly according to claim 1, wherein the meridian section of the protuberance having a larger dimension in a middle direction D1, and wherein the middle direction D1 of the meridian section of the protuberance forms, with a radial direction (ZZ'), an angle A at least equal to 5°.

5. The assembly according to claim 1, wherein the meridian section of the protuberance has a larger dimension in a middle direction D1, and wherein the middle direction D1 of the meridian section of the protuberance forms, with a radial direction (ZZ'), an angle A at most equal to 30°.

6. The assembly according to claim 1, wherein the axially inner connection point K of the protuberance to the axially outer face of the sidewall is positioned radially outside the radially outermost point J of the rim flange at a radial distance H2 at most equal to 10 mm.

7. The assembly according to claim 1, wherein the axially inner connection point K of the protuberance to the axially outer face of the sidewall is positioned axially outside the radially outermost point J of the rim flange.

8. The assembly according to claim 1, wherein the connection radius R, defined as the radius of curvature at the axially inner connection point K of the protuberance to the axially outer face of the sidewall, is at least equal to 2 mm.

9. The assembly according to claim 1, wherein the thickness E of the meridian section of the protuberance measured along the axial line D2, radially inside the axially inner connection point K of the protuberance to the axially outer face of the sidewall and positioned at a radial distance H3 therefrom equal to 3 mm, is at least equal to 1.5 mm.

10. The assembly according to claim 1, wherein the thickness E of the meridian section of the protuberance measured along the axial line D2, radially inside the axially inner connection point K of the protuberance to the axially outer face of the sidewall and positioned at a radial distance H3 therefrom equal to 3 mm, is at most equal to 8 mm.

11. The assembly according to claim 1, wherein each sidewall comprises a protuberance.

12. The assembly according to claim 1, the tire having a radially outermost point M in a median plane (XZ), and a theoretical height H in the sense of the "ETRTO" standard, measured between the radially outermost point M of the tire and the radially innermost point of the rim flange, wherein the tire has, on the axially outer face of each sidewall, an axially outermost point N positioned radially, relative to the radially outermost point M, at a radial distance H4 at least equal to H/2+5 mm.

13. The assembly according to claim 1, wherein the protuberance extends entirely around a circumference of the rim with a constant thickness.

14. An assembly comprising:
a rim as defined by the standard of "European Tire and Rim Technical Organisation" or "ETRTO"; and
a tire for a private passenger vehicle, mounted on the rim, comprising:
two sidewalls connecting a crown to two respective beads, each intended to come into contact with a rim flange having a radially outermost point J,
at least one sidewall comprising a protuberance intended to protect a rim flange and extending radially inward from an axially outer face of the sidewall and circumferentially in a circumferential direction (XX') of the tire, the protuberance having, in any meridian plane (YZ) containing the rotational axis (YY') of the tire, a meridian section delimited by a contour having a radially innermost point, called the radially inner end I of the protuberance, wherein when the tire is mounted on the rim and inflated to a pressure as defined by the "ETRTO" standard, the radially inner end I of the protuberance is positioned radially inside the radially outermost point J of the rim flange at a radial distance H1 at most equal to 10 mm and radially inside an axial end of the rim flange, wherein the contour of the protuberance comprises an axially inner connection point K of the protuberance to the axially outer face of the sidewall that is spaced apart from the rim, wherein the straight line tangent to the contour has an axial direction (YY'), positioned radially outside the radially outermost point J of the rim flange at a radial distance H2 at least equal to 3 mm.

15. The assembly according to claim 14, wherein the protuberance is in contact with the rim flange via at least one contact means distributed circumferentially.

\* \* \* \* \*